No. 12,568. REISSUED NOV. 27, 1906.
P. F. COWING.
SHOT MAKING MACHINE.
APPLICATION FILED MAR. 30, 1906.
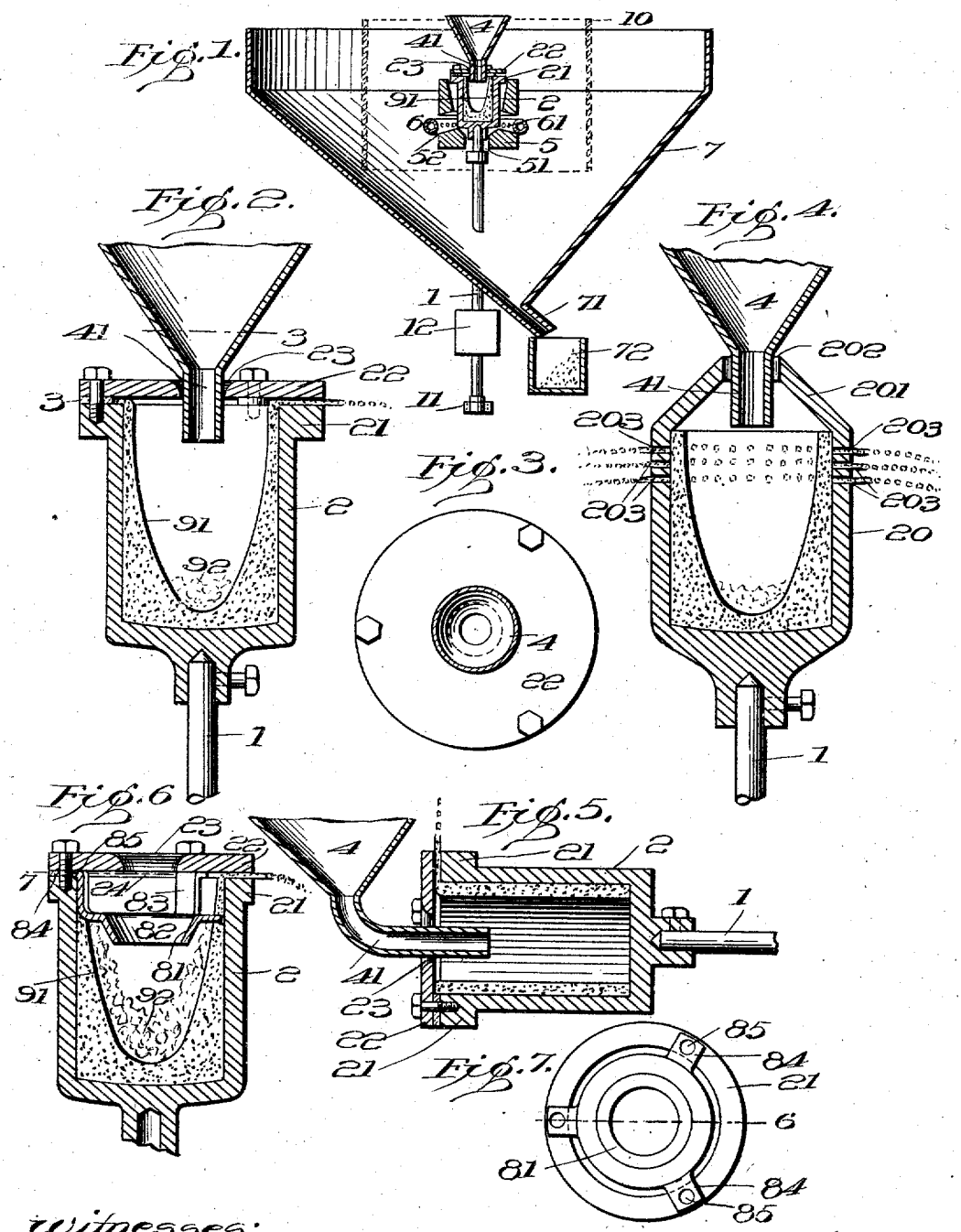
Witnesses:
F. Richards
John J. Ramagan
Inventor:
P. F. Cowing
By Wm. A. Negath
Attorney
THE NORRIS PETERS CO., WASHINGTON, D. C.

UNITED STATES PATENT OFFICE.

PERCY F. COWING, OF NEW YORK, N. Y.

SHOT-MAKING MACHINE.

No. 12,568. Specification of Reissued Letters Patent. Reissued Nov. 27, 1906.

Original No. 809,671, dated January 9, 1906. Application for reissue filed March 30, 1906. Serial No. 309,006.

*To all whom it may concern:*

Be it known that I, PERCY FOOTE COWING, a citizen of the United States, and a resident of the city, county, and State of New York, have invented certain new and useful Improvements in Shot-Making Machines, of which the following is a specification.

My invention relates to a machine for reducing molten metal into small solid particles, such as shot, and providing a simple device capable of continuous operation.

Another object is to provide means for separating the dross from the metal and for adjusting the machine to produce shot or particles of any required size.

The invention is illustrated in the accompanying drawings, which form a part of this application, and in the different views of which the same reference character indicates the same part.

Referring to the drawings, Figure 1 represents a vertical section of a shot-machine embodying my invention. Fig. 2 is an enlarged sectional view of the vessel for holding the molten metal. Fig. 3 is a view on line 3 of Fig. 2. Fig. 4 is a vertical sectional view of a modified form of vessel for holding the molten metal. Fig. 5 shows a modified form of my apparatus. Fig. 6 is a vertical section of another modification of my device, taken on line 6 of Fig. 7. Fig. 7 is a section on line 7 of Fig. 6.

The part marked 1 on the drawings represents a rotary shaft having a bearing 11 and which is actuated by a motor 12. Mounted on the shaft is a vessel 2 for receiving the molten metal. This vessel has a flange 21 surrounding its upper edge, to which is bolted a cap or cover 22, having a central contracted opening 23 therein. Between the cap 22 and the flange 21 washers 3 of any desired thickness may be inserted, forming a slit 24 between the cap and the flange 21. Above the vessel 2 is placed a funnel 4, having its tube 41 extending into said vessel through the opening 23 of the cap. Surrounding the vessel 2 is a stationary jacket 5, of non-conducting material, provided with a bottom opening 51, through which passes the shaft 1. This jacket is also provided with a plurality of lateral openings 52, into which is inserted the burner-tube 61 of the gas-pipe 6. The vessel 2, with its associated parts, is mounted within a funnel-shaped casing 7, having a spout 71 at the lower end thereof leading into a receptacle 72.

The operation of the apparatus will be readily understood from an inspection of the drawings taken in connection with the description. The parts being assembled as shown and described, the motor 12 or other source of power is put in operation to rotate the shaft 1 at the desired speed, and a supply of molten metal 91 having been poured into the vessel 2 through the funnel 4 the centrifugal force generated by the rotation of the said vessel will first separate the dross 92 from the molten metal, and the metal will move toward the open end of the vessel 2 and be ejected through the slit 24 between the flange 21 and the cap 22, substantially in the form of small particles or in a stream so fine as to break up into small particles as soon as it passes through the slit. These particles will be rapidly chilled in the air into shot or pellets, the size of which will be in part determined by the width of the slit 24. It is obvious that by connecting the gas-tube 6 with a supplv of gas the vessel 2 will be maintained at a sufficiently high temperature to keep the metal therein in a flowing condition. The shot or pellets formed from the metal ejected from the vessel 2 are caught in the casing 7 and delivered into the receptacle 72 through the spout 71.

In Fig. 4 of the drawings I have shown a modified form of vessel, which is marked 20. This vessel has a cone-shaped cover 201 integral therewith and having a mouth 202, through which the tube 41 of the funnel 4 extends. In this construction the upper walls of the vessel 20 are provided with a plurality of holes 203, through which the molten metal is ejected. The size of the shot formed by this construction is determined by the speed of rotation of the vessel, the fluidity of the metal, and the size of the openings 203.

It is clear that by constructing the apparatus as described the only escape for the molten metal will be through the peripheral apertures in the wall of the vessel 20 or the peripheral apertures between the flange 21 and cap 22 and that the vessel may be turned to a horizontal position as well as to a vertical position, as shown.

In Fig. 5 of the drawings I have shown the vessel located in a horizontal position. When so located, it is necessary to bend the neck 41 of the funnel so as to permit said neck to extend into the opening 23.

Where the amount of dross or lighter impure material to be separated from the molten metal is considerable, I provide a baffle, as shown in Figs. 6 and 7 of the drawings, for such purpose. This baffle consists of a plate of suitable material, the diameter of which is slightly less than the interior diameter of the vessel and secured in any suitable manner near the upper end thereof so that the heavier metal 91 is toward the walls of the vessel and flows out through the annular space between the periphery of the baffle-plate and the inner wall of the vessel, while the dross 92 is retained below said plate. In the construction shown by the drawings this plate is provided with a dish-shaped central portion 81, having a central aperture 82 therein. It is also provided with arms 83, having outturned ends or flanges 84, having openings 85 therein for the passage of the bolts by which the cap 22 is secured to the flange 21 of the vessel. In this construction the outturned ends 84 act as washers in separating the cap 22 from the flange 21 to form the slit 24 between the cap and said flange.

It is evident that various modifications other than those shown may be made without departing from the spirit of my invention. For example, in the different views of the drawings I have shown the vessel 2 or 20 in cylindrical form, and while this is a very desirable form of the invention, yet other forms might operate successfully and such other forms will be well within the scope of my invention. It is especially desirable, however, that the vessel should have a considerable depth as distinguished from the mere plate or saucer-shaped vessel. It is also desirable that such vessel be mounted to rotate in a horizontal or approximately horizontal plane and have its emission aperture or apertures located near the top of the vessel, or at any rate at a considerable distance above the bottom of the same. Such form and arrangement will not only provide an adequate space for the accumulation of dross, but, moreover, will operate with the greatest efficiency in respect both of the separation of the metal from the dross and in the formation of particles of size as nearly uniform as possible.

In some instances instead of producing shot or globular particles it is desirable to produce the metal in flattened or flaky form. In such cases I form baffles or impact-walls 10 adjacent to the rotary vessel, as indicated by dotted lines, Fig. 1, against which the metal ejected strikes and flattens. These walls completely surround the vessel and are placed near enough thereto to insure the striking of the molten metal against the baffles before it is entirely chilled.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense.

I desire it also to be understood that the language used in the following claims is intended to cover all of the generic and specific features of the invention herein described and all statements of the scope of the invention, which, as a matter of language, might be said to fall therebetween.

What I claim, and desire to secure by Letters Patent, is—

1. In a machine for converting molten metal into small solid particles, an approximately cylindric rotatable vessel having a peripheral emission-aperture so restricted in size as substantially to emit only small particles of metal, said aperture being located near the open end of said vessel and at approximately its greatest diameter.

2. In a machine for converting molten metal into small solid particles, an approximately cylindric vessel rotatable on a vertical axis and having a peripheral emission-aperture so restricted in size as substantially to emit only small particles of metal, said aperture being located near the open end of said vessel and at approximately its greatest diameter.

3. In a machine for converting molten metal into small solid particles, an approximately cylindric rotatable vessel having its wall pierced by a plurality of emission-apertures so restricted in size as substantially to emit only small particles of metal, said apertures being located near the open end of said vessel and at approximately its greatest diameter.

4. In a machine for converting molten metal into small solid particles, an approximately cylindric rotatable vessel having an open mouth and a peripheral emission-aperture so restricted in size as substantially to emit only small particles of metal, said aperture being located below said mouth, and means for feeding a supply of metal into said mouth.

5. In a machine for converting molten metal into small solid particles, an approximately cylindric rotatable vessel having a peripheral emission-aperture so restricted in size as substantially to emit only small particles of metal, said aperture being located near the open end of said vessel and at approximately its greatest diameter, and means for maintaining the metal in said vessel in a molten condition.

6. In a machine for converting molten metal into small solid particles, an approximately cylindric rotatable vessel having a peripheral emission-aperture so restricted in size as substantially to emit only small particles of metal, said aperture being located near the open end of said vessel and at approximately its greatest diameter, a burner for heating the exterior of said vessel, and a non-conducting jacket surrounding said vessel and spaced away therefrom for holding the heated products of combustion in contact therewith.

7. In a machine for converting molten metal into small solid particles, an approximately cylindric rotatable vessel having a peripheral emission-aperture so restricted in size as substantially to emit only small particles of metal, said aperture being located near the open end of said vessel and at approximately its greatest diameter, and a baffle-wall so located with relation to said emission-aperture as that the particles of metal escaping from said aperture will strike against said baffle before chilling.

8. In a machine for converting molten metal into small solid particles, a rotary vessel having a constricted emission-aperture near its open end, in combination with a baffle suitably supported in said vessel and spaced away from the inner wall of said vessel.

9. In a shot-making machine, a rotary vessel having a contracted mouth and constricted peripheral emission-apertures, in combination with a baffle suitably supported in said vessel and providing an annular space between its periphery and the inner wall of said vessel.

10. In a shot-making machine, a rotary vessel having a contracted mouth and constricted peripheral emission-apertures, in combination with an annular baffle having a central opening and a peripheral diameter slightly less than the interior diameter of the vessel, and means for supporting said baffle within said vessel.

11. In a shot-making machine, a rotary vessel, a cap secured on said vessel and having a contracted mouth and a baffle having an annular portion of less diameter than the interior of said vessel, and extending arms having outturned portions for fitting between the upper edge of said vessel and said cap.

12. In a machine of the class described, a vessel mounted for rotation in an approximately horizontal plane and having considerable depth as compared with its width, said vessel also having a peripheral emission-aperture which is arranged at a considerable distance from the bottom of the vessel and is so restricted in size as to emit only small particles.

13. In a machine of the class described, a vessel mounted for rotation in an approximately horizontal plane, said vessel being of greater length than diameter and provided with a peripheral emission-aperture near its upper end, said aperture restricted in size so as to emit small particles of molten metal.

14. In a machine of the class described, an open-mouthed vessel mounted for rotation in an approximately horizontal plane, said vessel being of greater length than diameter, and means for closing the open end of the vessel, said means having an opening therein through which a supply of metal may be fed to the vessel and said vessel having a peripheral emission-aperture which is so restricted in size as to emit small particles of molten metal and is arranged at a considerable distance above the bottom of the vessel.

15. In a machine of the class described, a vessel mounted to rotate in an approximately horizontal plane and having considerable depth as compared with its width, said vessel also having one or more emission-apertures to permit molten metal to be emitted therethrough, said apertures being located at a considerable distance above the bottom of the vessel, and a baffle-wall so located with reference to said apertures that the metal passing through the apertures will strike against the baffle before chilling.

16. In a machine of the class described, a rotatable vessel having a peripheral emission aperture so restricted in size as substantially to emit only small particles of metal, said aperture being located near one end of the vessel, and a baffle or impact wall so related to said emission-aperture that the particles of metal escaping from said aperture will strike against said baffle before chilling.

17. In a machine for converting molten metal into small solid particles, a vessel mounted for rotation and having a peripheral emission-aperture so restricted in size as substantially to emit only small particles of metal, said aperture being located at one end of and at a considerable distance from the other end of the vessel.

18. In a machine of the class described, a vessel mounted for rotation and having greater length than diameter, said vessel provided near one end with a peripheral emission-aperture so restricted in size as substantially to emit small particles of metal.

19. In a machine of the class described, a vessel mounted for rotation and having a peripheral emission-aperture located near one end thereof, said vessel also having a means adapted to hold the dross back from said apertures.

20. In a machine of the class described, a vessel mounted for rotation and having a peripheral emission-aperture located near one end thereof, said vessel also having a means for restricting the passage to said apertures so arranged in the vessel as to prevent the entrance of dross into said passage.

21. In a machine of the class described, a vessel mounted for rotation and having a peripheral emission-aperture located near one end thereof, said vessel also having a means adapted to cause the supply of metal for the emission-aperture to be drawn from beneath the level of the molten metal, thereby preventing clogging of said aperture.

In witness whereof I have hereunto set my hand, in the city, county, and State of New York, this 28th day of March, 1906.

PERCY F. COWING.

In presence of—
HENRY BOSSONG,
I. R. RICHARDS.